Oct. 25, 1966

L. HORNBOSTEL 3,280,501

REMOTELY CONTROLLED SAILING CRAFT

Filed Sept. 6, 1963

INVENTOR.
Lloyd Hornbostel
BY
ATTORNEYS

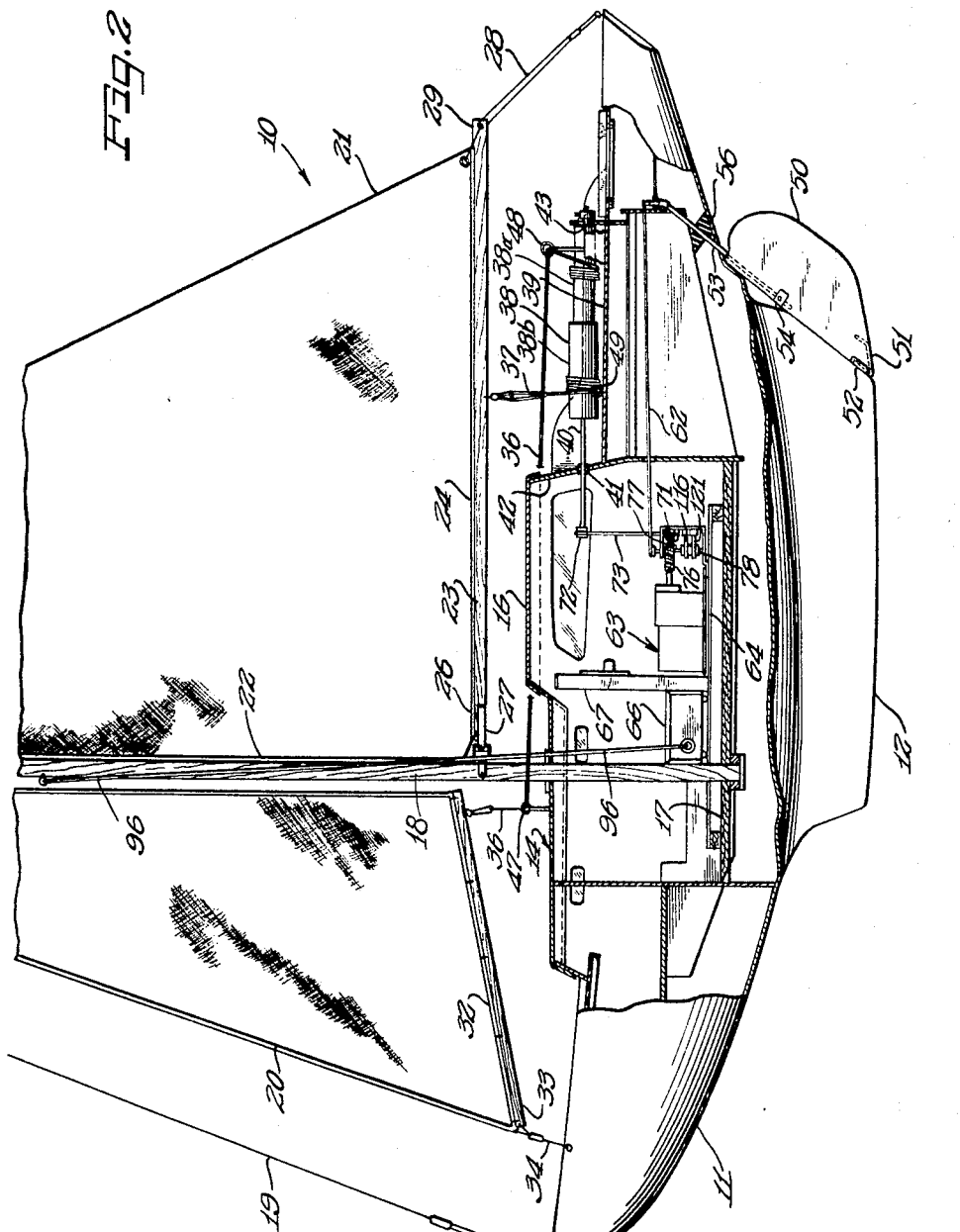

Oct. 25, 1966  L. HORNBOSTEL  3,280,501
REMOTELY CONTROLLED SAILING CRAFT
Filed Sept. 6, 1963  4 Sheets-Sheet 3
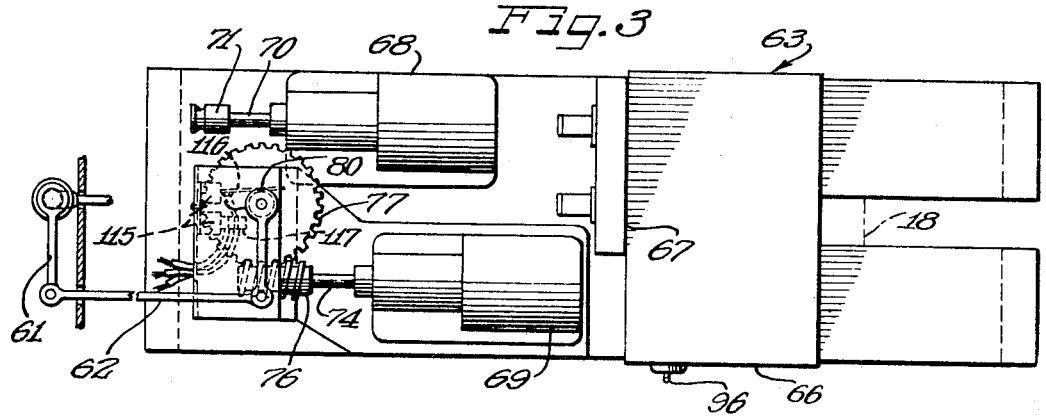
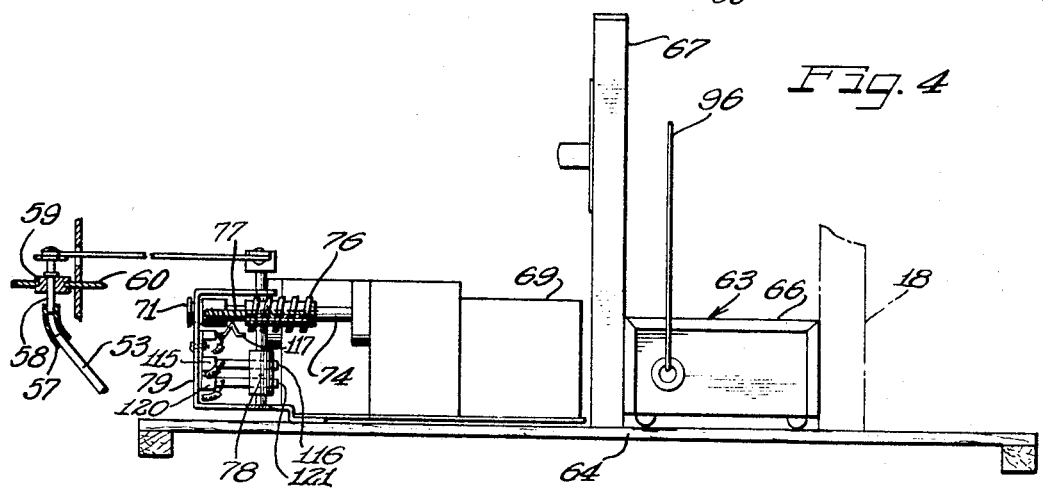
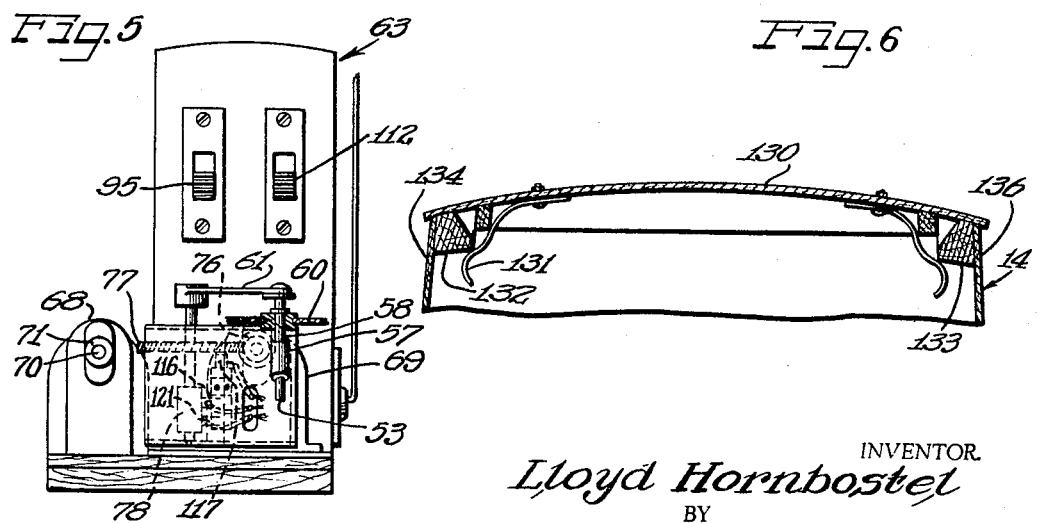
INVENTOR.
Lloyd Hornbostel
BY
ATTORNEYS INVENTOR.
Lloyd Hornbostel United States Patent Office 3,280,501
Patented Oct. 25, 1966

3,280,501
REMOTELY CONTROLLED SAILING CRAFT
Lloyd Hornbostel, 1638 Emmerson St., Beloit, Wis.
Filed Sept. 6, 1963, Ser. No. 307,256
4 Claims. (Cl. 46—244)

This invention relates generally to sailing vessels or craft and more particularly relates to a remote-controlled sailing craft fitted with electric motors for turning the rudder and trimming the sails whereby the craft can actually be arranged in good order for sailing in varying wind and sea conditions from a location remote from the craft, for example, from the shore.

The concepts of the present invention are particularly suited to a scale model of a large sailing vessel, but it will become apparent hereinafter that the size of the vessel may vary over a large size range, and although the invention will be described herein in connection with illustrative features of a reduced scale model of a sailing craft, such features are merely for purposes of illustrating a preferred embodiment of the invention and not for the the purpose of limiting the invention.

Sailing has become a favorite national pastime, but generally requires large expenditures of money and physical exertion to enjoy the sport. Many people lacking the financial means or physical endurance required to sail a large craft find enjoyment in sailing scale models of sailing boats equipped with many of the features of larger craft. Of course, in sailing scale models, no one is actually on board to trim the sails and operate the rudder since the size of the craft makes this prohibitive.

Heretofore, in sailing scale models, the rudder and sails were generally set in a fixed position on shore, and once the craft was placed in the water there was no control whatsoever over the craft, and it would sail in whatever direction the combined effects of wind and seas chose to steer it. Further, as wind and seas varied, adjustments of the rudder and sails could not be made for properly trimming and steering the craft. Also, sailing the craft from a point on shore out into a body of water and back to the same point on shore was virtually impossible, unless by some chance variations of the wind and seas combined to so direct the craft.

As a result of the complete lack of control over a scale model once it was placed in the water, the popularity of scale model sailing has been limited.

By means of the present invention, however, the rudder and sails of a scale model sailing craft can be controlled from shore or a position otherwise remote from the craft, thereby permitting an operator to maintain the craft in good arrangement for sailing under varying conditions of wind and seas. A course can also be maintained, to the same degree that the course of a larger sailing vessel can be maintained under similar sailing conditions. The present invention contemplates electrically powered motors on the craft which, in conjunction with associated rigging, operate the rudder and trim the sails.

The motors themselves are controlled by means of a radio set, the receiver of which is mounted on the craft and connected electrically to the motors and the transmitter of which is carried by the operator at his position on the shore or at another location remote from the craft.

According to the principles of the present invention, therefore, an operator can control the rudder and sails of the scale model to substantially the same extent that similar items are controlled on board a large vessel, and the craft can be maneuvered under varying weather conditions in much the same manner as a full scale sailing boat is maneuvered.

It is, therefore, an important object of the present invention to provide a sailing craft which can be arranged and maintained in good sailing order from a position remote from the craft.

Another object of the present invention is to provide a sailing craft incorporating means for setting the rudder and trimming the sails by remote control.

It is another object of the present invention to provide a scale model sailing sloop having a mainsail and a headsail or jib and means for trimming the sails simultaneously from a location remote from the craft.

And yet another object of the present invention is to provide a sailing craft having a movable rudder and sails and remotely controlled electrically operated motor means for positioning the sails and the rudder.

And still another object of the present invention is to provide a sailing craft having a plurality of sails, booms for trimming the sails, sheets for positioning the booms and remotely controlled windlass means for receiving the sheets.

Another object of the present invention is to provide a sailing craft having gear and linkage means for positioning a rudder and remotely controlled electrically operated motor means for controlling the gear and linkage means.

Another object of the present invention is to provide a sailing craft having a plurality of sails and a rudder, reversible electric motor means for providing power to trim the sails and position the rudder, and a radio receiver and transmitter set associated with the motors to selectively actuate by remote control independent operation of the motors in either direction.

Many other features, advantages and additional objects will become manifest to those versed in the art from the detailed description of the invention which follows and the accompanying sheets of drawings, in which a preferred embodiment of a sailing craft incorporating the principles of the present invention is shown by way of illustrative example.

On the drawings:

FIGURE 2 is a fragmentary side view of the sailing craft of FIGURE 1 with portions shown in section;

FIGURE 3 is a top plan view of a servo-motor and receiver assembly and associated parts constructed in accordance with the present invention;

FIGURE 4 is a side view of the assembly of FIGURE 3;

FIGURE 5 is an end view of the assembly of FIGURE 3;

FIGURE 6 is a fragmentary sectional view of a removable hatch or cover of the cabin of the craft.

As shown on the drawings:

Figure 1:
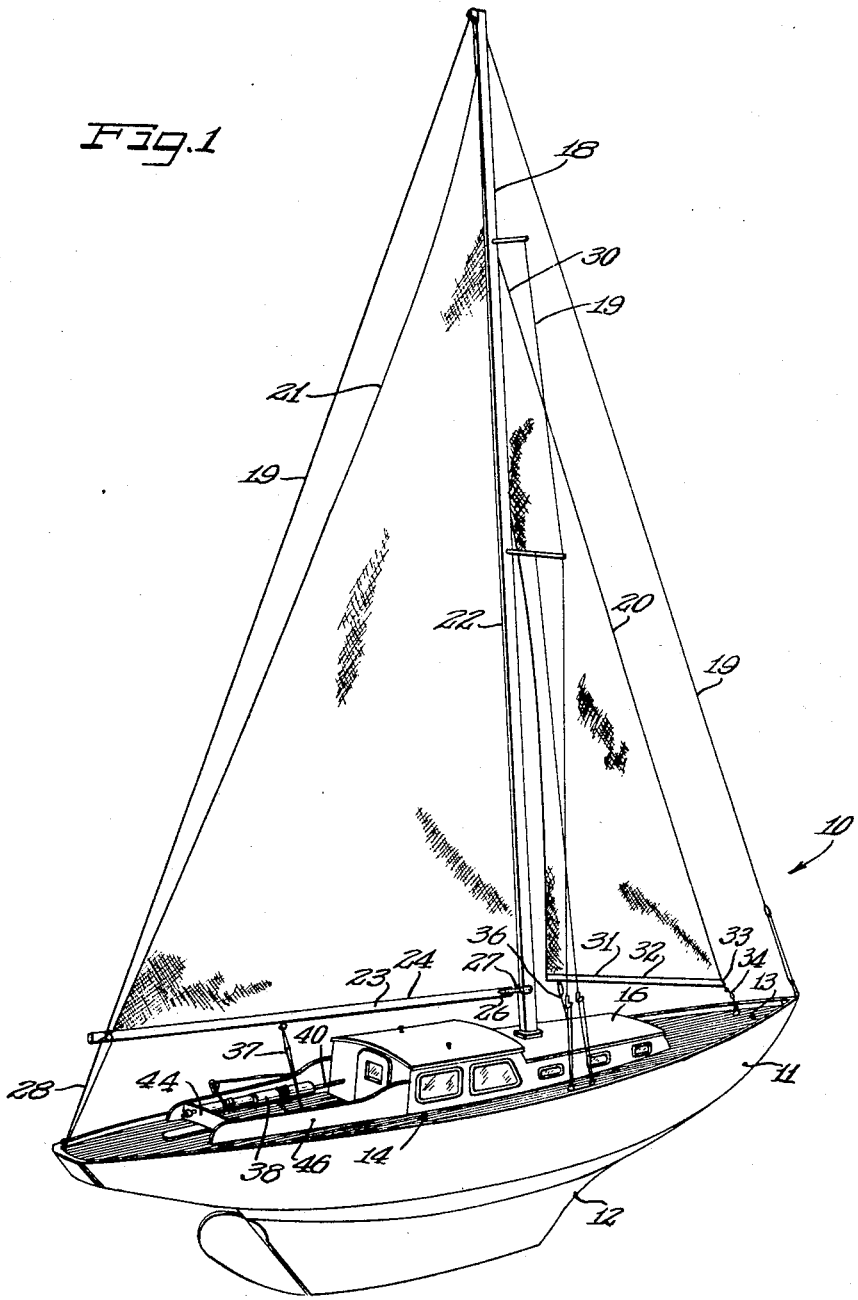
FIGURE 1 is a perspective view of a sailing boat incorporating the features of the present invention.

Although the principles of the present invention are of utility in any sailing craft, a particularly useful application is made to reduced scale models of large sailing boats and an illustrative embodiment herein shown consists of a sloop having a single fore and aft rigged mast with a single headsail jib, as indicated generally in FIGURES 1 and 2 of reference numeral 10.

The craft 10 includes a conventional hull 11 which may be constructed of any suitable material, for example, plank, molded plywood, molded plastic and the like. A keel 12 projects downwardly from the bottom of the hull 11 and may be weighted with appropriately distributed lead shot to properly balance the rigged hull.

The top portion of the hull 11 is covered with suitable decking material to form a deck 13, and approximately intermediately fore and aft of the hull 11 a cabin 14 is formed therein, a top portion 16 of which protrudes above the deck 13.

Supported by a flooring 17 of the cabin 14, is a mast 18. The mast 18 is mounted in the hull 11 and extends outwardly through the top portion 16 of the cabin 14. A plurality of cables 19 extend from various elevations on the mast 18 to the hull 11, for providing additional support and rigidity to the mast 18. Such support is particularly appropriate when the craft is under full sail and in a good wind.

In the embodiment illustrated, the mast 18 is rigged fore and aft respectively with a headsail or jib 20 and a mainsail 21. A leading edge 22 of the mainsail 21 is fitted with a plurality of spacers (not shown) adapted to ride in a sail track (not shown) formed in the mast 18 for raising and lowering the mainsail while maintaining the forward edge 22 thereof in engagement with the mast 18.

A horizontally extending boom 23 is secured to a lower edge 24 of the mainsail 21 by means of a spacer and sail track arrangement (not shown). A front portion 26 of the boom 23 is connected for universal pivotal movement to the mast 18 by means of a universal connector joint 27. A cable 28 is connected to the stern of the hull 11 and to a rear end 29 of the boom 23 for limiting the movement of the boom. It will be understood that the cable 28 does not restrict pivotal movement of the boom 23 about the universal joint 27, but merely limits the arc through which the boom may travel.

A top portion 30 of the headsail 20 is suspended from the mast 18 by a length of cable (not shown). A lower edge 31 of the headsail 20 is secured to a boom 32 by means of conventional spacer and sail track construction (not shown), and a front end 33 of the boom 32 is maintained in a stationary position by means of a cable and pulley assembly 34 secured to the deck 13 at the bow of the hull 11.

Proper positioning of the sails is an important consideration in sailing, and is generally determined by the direction of the prevailing winds relative to the course of the craft. As the direction of the wind varies relative to the course of the craft the booms 23 and 32 must be brought about and repositioned accordingly in order to properly trim the sails to make the most efficient use of the wind. Further, when a course is set against the wind, a tacking or zig-zag maneuver is necessary for approaching the wind at an angle. Such a maneuver requires the periodic bringing about of the booms to maintain trim sails as the course is changed back and forth into the wind. By trim sails is meant the arranging of the sails as determined by positioning of the booms to provide for optimum effect of the wind on the sails under given sailing conditions which include the direction of the wind and the course which is set.

It is necessary for properly trimming the sails that the free end of the boom be maintained in a position such that the direction of the boom relative to the wind sets the sails to provide the most effective use of the wind, and for this reason a cable or sheet 36 is secured to the boom 32 a distance from the relatively stationary front end 33. Under varying weather conditions, the sheet 36 must be let in or out in order to adjust the position of the boom 32 to maintain the headsail 20 in trim condition.

Similarly, a sheet 37 is secured to the boom 23 a distance from the relatively stationary end 26 and loosening or tightening of the sheet 37 is necessary for maintaining the mainsail 21 in trim condition under varying weather conditions.

In order to control taking in and letting out of sheets 36 and 37, a rotatable horizontally extending cylindrically shaped windlass 38 is situated on an afterdeck portion 39 of the deck 13 behind the cabin 14. The windlass 38 is mounted for co-rotation on an axle 40 journalled for rotation in a bearing member 41 carried by a bulkhead 42 of the cabin 14 and another bearing member 43 supported by a transverse member 44 of coaming 46 enclosing the afterdeck 39.

Sheets 36 and 37 are wrapped respectively about small and large diameter portions 38a and 38b of the windlass 38, and the relative diameters of portions 38a and 38b are directly proportional to the respective boom radii of booms 32 and 23, boom radius being defined as the distance between the pivotal end of a boom and the point on the boom at which its respective sheet attaches thereto. The boom radii of booms 32 and 23 are dissimilar, but because of proportional dissimilarity in the diameters of portions of 38a and 38b, the booms can be let in or let out the same relative amount, thereby providing for trimming of both the larger mainsail 21 and the smaller headsail 20 from a single windlass 38.

In order to properly wind sheet 36 on windlass 38, it is necessary that the sheet be received on the windlass at substantially a right angle to the axis of rotation of the windlass, and for that reason an eyelet 47 fixedly secured to the hull 11 receives the sheet 36 as it extends from the boom 32 and another eyelet 48 secured to the hull 11 adjacent the windlass 38 receives the sheet 36 from the eyelet 47 and guides the sheet as it winds and unwinds about the windlass. Similarly, an eyelet 49 is situated adjacent the windlass 38 for receiving the sheet 37 and for guiding the sheet as it is wound about the windlass 38.

In order to steer the craft through the water, a conventional rudder 50 is situated exteriorly of the hull 11 and astern of the keel 12. A lower portion 51 of the rudder 50 is hinged for pivotal movement to the keel 12 as at 52 and a rudder shaft 53 is fastened to the rudder as at 54 for co-rotation therewith about an axis angularly spaced from the vertical. The rudder shaft 53 is supported for rotation by a rudder shaft support 56 secured in fixed assembly to the hull 11.

Figure 7:
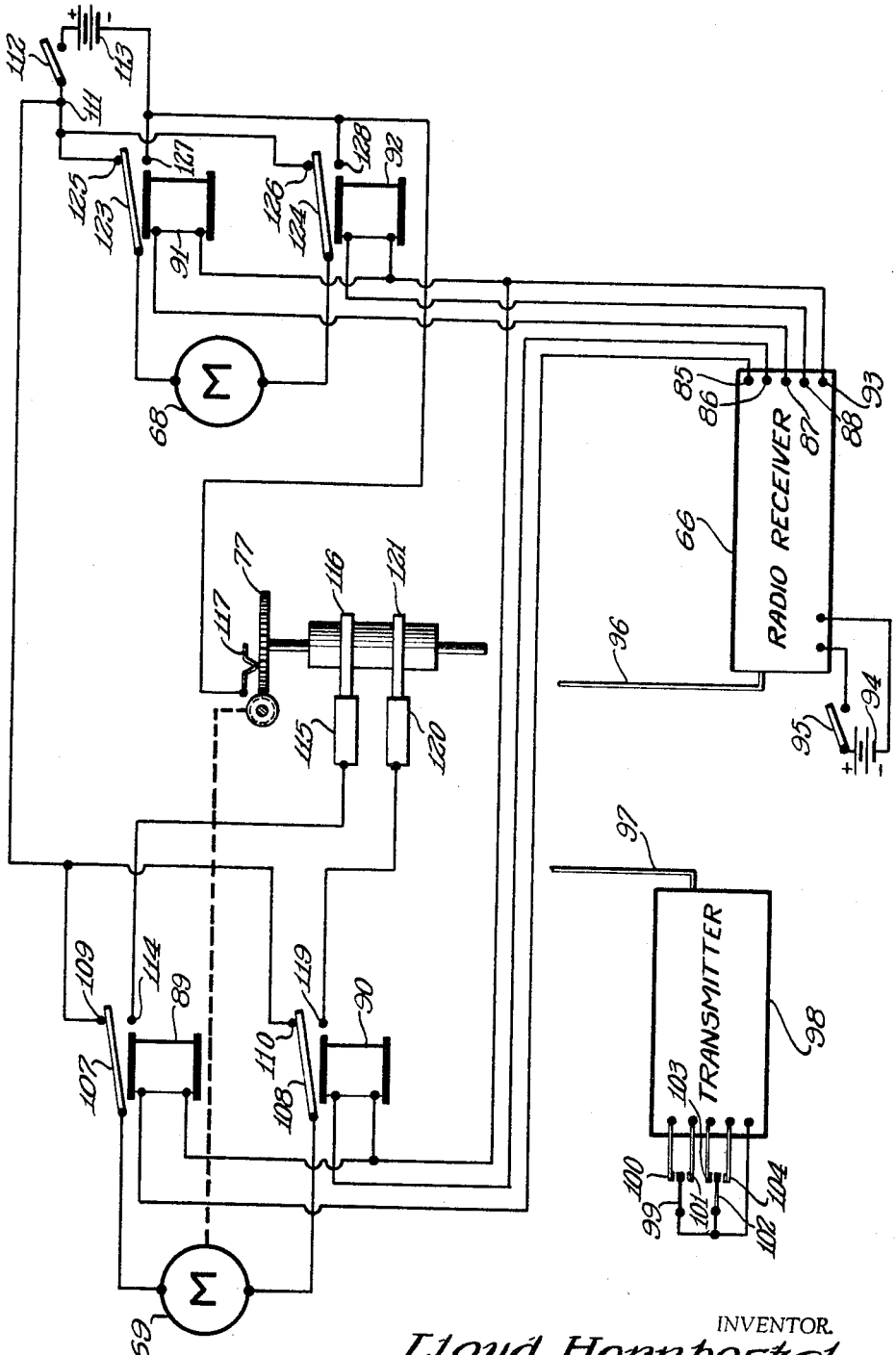
FIGURE 7 is a schematic wiring diagram of the servo-motor and receiver assembly of FIGURE 3 and including a transmitter assembly associated therewith.

As best illustrated in FIGURES 3 and 4, the angularly extending rudder shaft 53 is connected for co-rotation by means of a flexing flexible coupling 57 to a vertically extending rotatable member 58 journalled for rotation in bearing means 59 supported by a mounting block 60. A horizontally extending member 61 is connected in fixed assembly to the member 58 for co-rotation therewith and has pivotally connected thereto at the distal end thereof a connecting arm 62 which extends horizontally forwardly through the bulkhead 42 into the cabin section 14. In accordance with the principles of the present invention, the windlass 38 and the rudder 50 are operated by a battery powered remote-controlled servo-motor and receiver assembly indicated generally at 63 in the drawings and situated in the cabin section 14 of the hull 11. The assembly 63 is of a known type, and the embodiment illustrated comprises a four channel radio transmitter and receiver (FIGURE 7).

As illustrated, the assembly 63 comprises a mounting plate 64 securely affixed to the cabin flooring 17 and having mounted thereon a radio receiver 66, a control panel 67 and a pair of reversible electrically powered motors 68 and 69, all appropriately electrically interconnected as described in detail hereinafter.

Motor 68 is a sheet control motor for rotating the windlass 38 and comprises a rotatable shaft 70 having a grooved head portion or sheave 71 mounted at the end thereof for co-rotation therewith. As best illustrated in FIGURE 2, sheave 71 is situated vertically below a complementarily arranged sheave 72 mounted on the axle 40 of the windlass 38, and a flexible endless belt 73 is trained over sheaves 71 and 72 for transmitting rotative movement therebetween.

Motor 69 is a rudder control gear motor and comprises a rotatable shaft 74 having a wormed gear 76 mounted thereon for co-rotation therewith. A spur gear 77 is mounted on a shaft 78 journalled for rotation in a U-shaped member 79 and is in meshing relation with the worm gear 76. A horizontally extending arm 80 shaped complementarily to the member 61 is fixedly connected to the shaft 78 and connected for pivotal movement to the connecting arm 62.

As noted hereinabove, motors 68 and 69 are reversible and through the receiver 63 can be selectively controlled to rotate the windlass 38 and the rudder 50 in either direction for independent trimming of the sails and steering of the course.

FIGURE 7 is an electrical circuit diagram of the arrangement for controlling energization of the sheet control motor 68 and the rudder control gear motor 69. As shown, the radio receiver 66 is a four channel receiver having four output terminals 85, 86, 87 and 88 respectively connected to terminals of four relays 89, 90, 91 and 92 and having a common terminal 93 connected to the other terminals of the relays 89–92. Power input terminals of the receiver 66 are connected to a battery 94 through an on-off switch 95 located on the control panel 67. An antenna 96 extends upwardly from the receiver along the mast 18 and receives signals emanated from a transmitting antenna 97 connected to a transmitter 98 at a remote location. The transmitter is controlled by a first switch 99 selectively engageable with contacts 100 and 101 and a second switch 102 selectively engageable with contacts 103 and 104. The first switch operates to control the rudder when contact 99 is engaged with contact 100, a voltage is produced at the output terminal 85 of the receiver sufficient to energize the relay 89. Similarly when contact 99 is engaged with contact 101, a voltage is produced at the receiver output terminal 86 sufficient to energize the relay 90. The second switch operates as a sheet control switch, contact 102 being selectively engageable with contacts 103 and 104 to energize relays 91 and 92.

The terminals of the rudder control motor 69 are connected to movable contacts 107 and 108 of the relays 89 and 90, normally engaged with fixed contacts 109 and 110 which are connected to a circuit point 111 which is connected through a servo-switch 112, on the control panel 63, to one terminal of a battery 113.

When the relay 89 is energized, the contact 107 is engaged with a contact 114 which is connected to a limit switch contact 115 engaged with a contact plate 116 mechanically and electrically connected to the worm gear 77 which is engaged by a contact 117 connected to the negative terminal of the battery 113. Accordingly, when the switch 112 is closed and when the relay 89 is energized, the motor 69 will be energized in one direction to rotate the rudder arm in one direction. When the arm reaches the limit of its travel in that direction, a notch in the plate 116 is disposed opposite the end of the contact 115 to open the circuit of the motor 69. The relay 90, however, may be then energized to engage the contact 108 with a contact 119 connected to a contact 120 which is engaged with a plate 121 similar to the plate 116, and with the relay 89 deenergized, the motor 69 is energized in the reverse direction. Rotation of the motor 69 can be continued in the reverse direction until a notch in the plate 122 is disposed opposite the end of the contact 120 to open the circuit.

The relays 91 and 92 have contacts 123 and 124 normally engaged with contacts 125 and 126 connected to the circuit point 111. When the relay 91 is energized, contact 123 is engaged with a contact 127 connected to the negative terminal of the battery 113 and the motor 68 is energized in one direction. When the relay 92 is energized, contact 124 is engaged with a contact 128 connected to the negative terminal of the battery 113 and with relay 91 deenergized, the motor 68 is energized in the reverse direction.

Accordingly, the rudder control gear motor 69 and the sheet control motor 68 may be controlled from a remote point by operation of the switch contacts 99 and 102 connected to the transmitter 98.

As illustrated in FIGURE 6, the cabin 14 is covered by a removable cabin hatch 130 having a plurality of flexible spring clips 131 attached thereto urged outwardly against beveled corner members 132 and 133 of walls 134 and 136 of the cabin 14. The hatch 130 can easily be removed from the cabin 14 by means of a light upwardly directed force applied thereto, thereby gaining access to the interior of the cabin 14 and the servomotor and receiver assembly 63 and associated parts. The hatch can be affixed to the top of the cabin 14 by applying a light downwardly directed force thereto, thereby engaging the spring clips 131 with the members 134 and 136 to bend the spring clips inwardly until they pass below the members, after which the clips will resiliently engage the members in snug pressing relation.

Thus there has been provided a sailing craft equipped with sails, rudder, electric motor means for trimming the sails and operating the rudder and a radio transmitter-receiver set for controlling the operation of the motors from a location remote from the craft, for example, from shore. The craft can be arranged in due sailing trim under varying weather conditions in a manner similar to manned craft, and the skills employed in sailing a large craft can be exercised to a large extent in operating the radio-controlled craft of the present invention.

Although various modifications might be suggested by those versed in the art, I wish to embody within the scope of the patent warranted hereon all such modifications as come within the scope of my contribution to the art.

I claim as my invention:

1. In a sailing craft,
    a mast,
    a windlass having different diameters extending parallel to the longitudinal axis of said craft,
    a plurality of different size sails rigged on the mast,
    a plurality of booms attached respectively to each of the sails and connected to the craft for horizontal pivotal movement, power means connected to said windlass,
    a plurality of sheets connected respectively to said booms in spaced relation to the pivot points of said booms and extending perpendicular to the bottom edge line of said sails, means for reeving said sheets around respective different diameters of said windlass, both said reeving means and said power means permitting simultaneous taking up and letting out of said sheets to position said booms in parallel alignment, and
    means for controlling said power means from a location remote from said craft.

2. In a sailing craft having a hull and a vertically extending mast mounted on the hull,
    a plurality of different size sails rigged on the mast in trim alignment,
    a plurality of booms connected respectively to each of said sails and extending substantially horizontally above said hull,
    said booms being in spaced parallel alignment when the sails are trimmed,
    one end of each of the booms being maintained in a fixed position relative to said hull, the other end being free to pivot about said fixed end,
    a plurality of sheets connected respectively to said booms in spaced relation to said fixed ends and extending perpendicular to the bottom edge line of said sails, the distance between the fixed end of each of the booms and the point at which the sheet is connected to said boom varying from boom to boom,
    a windlass having different diameters extending parallel to the longitudinal axis of the craft, electric motor means for powering said windlass, means for reeving said sheets around respective different diameters of said windlass, both said reeving means and said power means permitting simultaneous taking up and letting out of said sheets, and radio signal operated control means for controlling said electric motor means to maintain trim sails and operable from a location remote from said craft.

3. In a sailing craft having a hull, a mast, a mainsail, a headsail of different size than the mainsail, a swingable boom on each sail and connected to the craft for horizontal pivotal movement for trimming the sail and a rotatable rudder for steering the craft, the improvement of means for remotely controlling the booms and the rudder from a location remote from the craft, said improvement comprising, a windlass having different diameters rotatably mounted lengthwise on the hull,
a pair of sheets attached respectively to said booms in spaced relation to the pivot points of said booms and wound about said windlass for swinging said booms, means for guiding said sheets on respective different diameters of said windlass at right angles to the axis of rotation thereof,
a steering arm connected to said rudder for rotation thereof,
gear and linkage means operatively connected to said steering arm,
a pair of reversible electric motors connected respectively to said windlass and said gear and linkage means for imparting rotation thereto, both said guiding means and one of said electric motors permitting simultaneous taking up and letting out of said sheets to position said booms in parallel alignment,
a radio receiver on the craft for receiving radio signals and for controlling said motors in response to said signals, and
a radio transmitter for sending signals to said receiver from a location remote from said craft,
whereby a radio operator can arrange the craft in good order for sailing without having any mechanical contact or connection with the craft.

4. A remotely controlled sailing craft comprising,
a hull having a cabin formed therein,
a deck on the hull,
a bulkhead forming a rear wall of said cabin,
said deck forming an after deck aft of said bulkhead,
a mast mounted on said hull and extending vertically upwardly through said deck,
a headsail and a mainsail depending from said mast fore and aft thereof respectively,
a pair of booms fixedly secured respectively to the lower portions of said sails,
the forward end of each of said booms being pivotally fixed relative to the hull such that the booms can swing about their forward ends in a horizontal plane,
a pair of sheets secured respectively to said booms at a distance from the forward ends thereof,
a horizontally extending windlass positioned on the after deck and extending lengthwise of the hull for receiving said sheets,
said windlass having a large and a small diameter portion,
said sheets being wound respectively about said large and said small diameter portions of said windlass,
a horizontal shaft mounting said windlass for co-rotation therewith and extending through said bulkhead into said cabin,
a plurality of journal means mounted respectively in the bulkhead and on the after deck for rotatably carrying said shaft,
eyelet means mounted on the hull for guiding said sheets onto the windlass at right angles to the axis of rotation of said windlass,
a first reversible electric motor mounted in said cabin and having a shaft extending therefrom,
belt means wrapped around said first motor shaft and said windlass shaft for rotatably driving said windlass,
a rudder pivotally mounted on said hull exteriorly thereof and having a shaft extending interiorly into said hull at an angle from the vertical,
a vertically extending member mounted for rotation on said hull,
flexible coupling means interconnecting said vertically extending member and said angularly extending rudder shaft for translating rotative movement of said member to said rudder,
a horizontally extending rudder steering arm fixedly secured to said member,
a second reversible electric motor in said cabin and having a rotatable shaft extending horizontally therefrom,
a worm gear mounted on said second motor shaft for co-rotation therewith,
a spur gear rotatably mounted in said hull in meshing relation with said worm gear,
a vertically extending axle mounting said spur gear for co-rotation therewith,
a horizontally extending arm fixedly secured to said spur gear axle for rotation therewith,
a connecting arm interconnecting said horizontally extending arm and said rudder steering arm for imparting rotative movement therebetween,
means for energizing said motors,
a four channel radio signal receiver mounted in said cabin and operatively connected to said first and said second motors for independently controlling the rotation of said motors in clockwise and counterclockwise direction, and
four channel radio signal transmitter means remote from the craft for transmitting signals to said receiver to effectively energize said motors for selectively and independently swinging the booms and rotating the rudder to arrange the craft in trim sailing condition from a location remote from the craft.

References Cited by the Examiner
UNITED STATES PATENTS

| | | | |
|---|---|---|---|
| 1,437,685 | 12/1922 | Scharpenberg et al. | 254—184 |
| 2,364,233 | 12/1944 | Morey | 46—93 X |
| 2,742,735 | 4/1956 | Sommerhoff | 46—93 X |
| 2,855,702 | 10/1958 | Taylor | 35—11 |

RICHARD C. PINKHAM, *Primary Examiner.*

F. B. LEONARD, *Assistant Examiner.*